(Model.)

W. H. BATE.
Bottle Stopper and Fastening.

No. 231,524. Patented Aug. 24, 1880.

Witnesses,
W. J. Cambridge
Chas. E. Griffin

Inventor,
Wallace H. Bate
per J. C. Teschemacher
Atty

UNITED STATES PATENT OFFICE.

WALLACE H. BATE, OF BOSTON, MASSACHUSETTS, ASSIGNOR TO HIMSELF AND JOSEPH MIDDLEBY, OF SAME PLACE.

BOTTLE STOPPER AND FASTENING.

SPECIFICATION forming part of Letters Patent No. 231,524, dated August 24, 1880.

Application filed June 14, 1880. (Model.)

*To all whom it may concern:*

Be it known that I, WALLACE H. BATE, of Boston, in the county of Suffolk and State of Massachusetts, have invented an Improved Bottle Stopper and Fastening, of which the following is a full, clear, and exact description, reference being had to the accompanying drawings, making part of this specification, in which—

Figure 1:
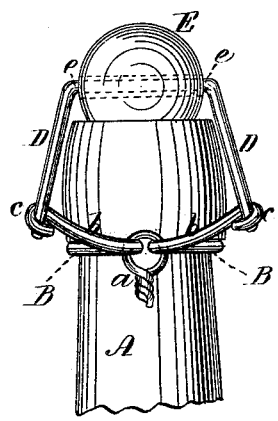
Figure 2:
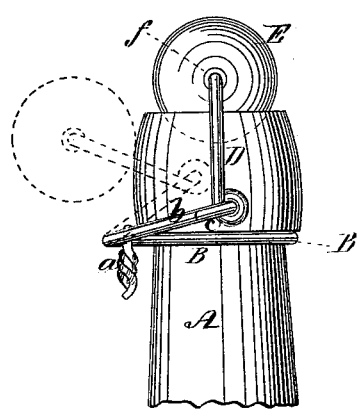
Figure 3:
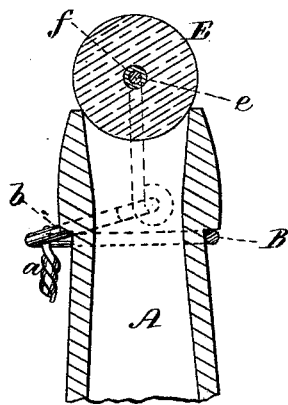

Figure 1 is a rear elevation of my improved bottle stopper and fastening applied to the neck of a bottle. Fig. 2 is a side elevation of the same. Fig. 3 is a vertical section through the same.

My invention consists in an elastic or compressible stopper mounted on a swinging bail, which passes through it, and is pivoted on opposite sides to spring-arms projecting from a band or collar which encircles the neck of the bottle, which construction greatly facilitates the operation of opening and closing the bottle and insures the stopper being held down tightly on its seat as required, to prevent the escape of gas when the bottle contains aerated liquid.

In the said drawings, A represents the neck of a bottle, around which is fitted a wire collar or band, B, which is held tightly in place by means of a piece of wire, a, twisted thereover, the opposite ends of the band B being bent outward, so as to form spring-arms b, at the outer extremities of which are formed loops or eyes c, for the reception of corresponding loops at the lower ends of a wire bail or frame, D, which swings on the ends of the arms b as a center.

On the upper horizontal portion, e, of the bail D is mounted the stopper E, which is composed of soft rubber or other suitable compressible material, and is preferably of spherical form. This stopper is provided with a metallic bushing, f, which forms a bearing for the horizontal portion e of the bail, and prevents it from cutting into or injuring the stopper, while it also facilitates the free rotation of the stopper on its support.

To close the bottle the bail D is swung up and the compressible stopper E forced over the edge of the mouth of the bottle, and as soon as the portion e of the bail has passed over the center the elasticity of the stopper held down by the bail D will cause it to spring tightly onto its seat, as seen, in which position the downward pressure exerted by the spring-arms b will tend to hold the stopper still more firmly on its seat, so as to prevent any possibility of the escape of the liquid or gaseous contents of the bottle.

To remove the stopper it is merely necessary to force it with the swinging bail by the pressure of the hand away from its seat over the edge of the mouth of the bottle, as seen dotted in Fig. 2, the elasticity or compressible nature of the material of which the stopper is composed admitting of this movement; and it will be seen that when a spherical elastic stopper is employed its rotation on its support will cause different portions of its surface to be brought into use, thus greatly increasing its durability.

The stopper, instead of being spherical, may be of some other suitable form, as its compressibility, combined with the elasticity of the spring-arms b, will allow of its being easily sprung onto or away from its seat over the edge of the mouth of the bottle.

I lay no claim to the combination of a rubber stopper, an internal tubular sleeve, and the yoke or bail of a bottle-stopper passing through said sleeve; but

What I claim as my invention, and desire to secure by Letters Patent, is—

An elastic or compressible stopper, E, mounted on a swinging bail or frame, D, pivoted on opposite sides to spring-arms b, projecting from a collar or band secured to the neck of the bottle, constructed to operate substantially in the manner and for the purpose set forth.

Witness my hand this 10th day of June, A. D. 1880.

WALLACE H. BATE.

In presence of—
P. E. TESCHEMACHER,
W. J. CAMBRIDGE.